Patented Feb. 1, 1927.

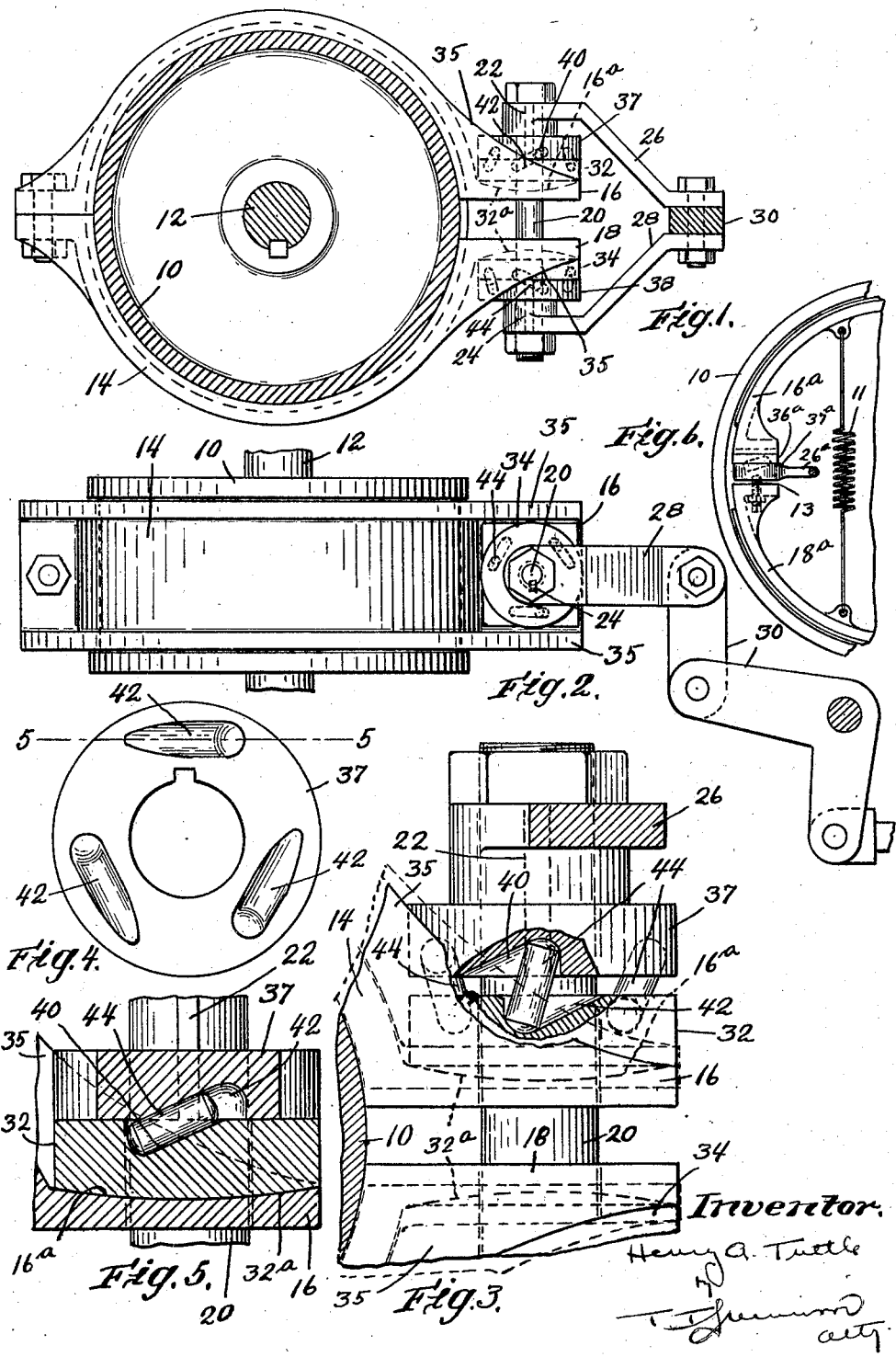

1,616,241

UNITED STATES PATENT OFFICE.

HENRY A. TUTTLE, OF UPTON, MASSACHUSETTS.

BRAKE MECHANISM.

Application filed May 9, 1925. Serial No. 29,205.

This invention relates to brake-mechanisms of the type having a rotatable brake drum and a flexible resilient band which encircles and is adapted to be contracted about the drum by actuating mechanism which engages the proximate ends of the brake band.

The actuating mechanism for a brake band of the type above set forth usually includes cooperating and over-riding cam members. This type of mechanism ordinarily requires a substantial amount of power to operate it, over and above that actually required to contact the brake-band, and the co-acting cam surfaces are subject to rapid wear.

An object of this invention is the provision of brake-actuating mechanisms in which the power-loss is reduced and which is relatively free from wear.

A further object is generally to improve the construction of brake mechanisms.

Fig. 1 is an end elevation of a brake-mechanism embodying the invention.

Fig. 2 is a plan view of Fig. 1.

Fig. 3 is an enlarged plan detail partly in section, of a portion of the actuating mechanism.

Fig. 4 is a front view of one of the actuating discs, and illustrating the disposition of the strut-pin recesses therein.

Fig. 5 is a plan view taken along line 5—5 of Fig. 4.

Fig. 6 is a detail illustrating the application of the invention to an internal brake mechanism.

As here shown the brake mechanism includes the brake-drum 10 fixed to the rotatable shaft 12. A resilient brake-band 14 encircles said drum and is provided with two proximate and approximately radially-outstanding end-portions 16 and 18. Said end-portions are adapted to be forced inwardly toward each other by the actuating mechanism embodying the invention, whereby to contract the band into frictional contact with the drum. When the pressure on the band-ends is released, the band is adapted to expand, by its inherent resiliency, away from engagement with the drum.

The brake-actuating mechanism includes a shaft 20 which is passed loosely through the band-ends 16 and 18 and extends in opposite directions therebeyond. The extended ends of said shaft are received in and are fixed by keys 22 and 24, or other suitable means, to the ends of arms 26 and 28 of an operating yoke which straddles and is spaced from the band ends. Suitable mechanism 30 is pivoted to the free ends of said arms whereby to rotate said shaft 20 in its bearings in the band-ends 16 and 18 and effect the operation of the brake.

Means are provided which are adapted to be actuated by the rotary movement of said shaft 20 to contract the brake band. Said means include discs 32 and 34, which discs are of square or other non-circular formation and are disposed loosely between ribs 35 of the brake-band, in which position they are restrained from rotation by engagement with said ribs. The lower faces 32$^a$ of said discs may be of approximately spheroidal formation, and the cooperating faces 16$^a$ of the band ends may be complementally formed whereby to provide a self-aligning engagement between each disc and the brake band. Cooperating and actuating discs 37 and 38 are disposed on said shaft 20 adjacent said fixed discs and are fixed to said shaft by said keys 22 and 24. Each set of discs, as 32 and 37, and 34 and 38, have their proximate faces formed with a plurality of recesses 40 and 42 therein. Said recesses are disposed in the faces of the discs at approximately equal distances from the center of the discs and are tangential to the radii of the discs. Preferably the recesses are equiangularly disposed in the faces of the discs. The recesses 40 and 42 in a set of discs are adapted to be complemental to each other, and each pair of complemental recesses is adapted to form a slot approximately one-half of which is in each disc. The recesses may have any suitable shape but preferably are of such shape as to form cylindrical slots, as shown. The axes of the slots are arranged to lie transversely of the faces of the discs, and thereby of the plane of rotation of said discs. When the brake-band is in its expanded position, or out of operative engagement with the brake-drum, it is adapted to support its discs 32 and 34 in positions approximately in contact with the cooperating discs 37 and 38, as shown in Fig. 1.

Strut-pins 44 are received in the slots and are adapted to lie loosely therein. Said pins are here shown as cylindrical and, preferably, are formed with convex heads 46. The dimensions of said pins are such that the similar ends thereof lie mainly in one disc while the opposite ends lie mainly in the cooperating disc, as illustrated in Fig. 5. Preferably the pins are somewhat shorter than the slots they occupy, whereby to permit a certain freedom of movement of the actuating yoke, for adjustments or otherwise, without actuating the brake-band.

As thus arranged, when the shaft 20 and the discs 37 and 38 are rotated in a counter-clockwise direction, the recesses in said discs are displaced for register with the complementary recesses in the discs 32 and 34 carried by the brake-band, and the end-walls of the recesses are brought up against the ends of the strut-pins 44. A further rotary movement of the shaft 20 and discs 37 and 38 in the same direction to tilt or straighten the pins, as illustrated in Fig. 3, and thereby to force the ends of the brake-band inwardly toward each other, whereby the contract the band about the brake drum.

The discs 32 and 34 may slide in their seats on the band-ends to compensate for any changes of angular position of the band ends, during the setting of the brake.

The frictional engagement between the parts of the mechanism is limited to the ends of the strut-pins and to the end-walls of the recesses. The amount of movement between the surfaces is relatively small so that the power loss in and wear on the mechanism is relatively small.

Pressure is exerted on the pins at all times when the mechanism is being operated either due to the rotation of the shaft to set the brake, or due to the elasticity of the brake-band, when the mechanism is being moved to release the brake. Consequently the strut-pins are held in their slots against possibility of escape. When the brake is released and the mechanism is in an operative position, the pins are loose in the slots, but the walls of the slots are adapted substantially to enclose the pins and confine them against escape from the slots.

The strut-pins acting on opposite ends of the brake-band are inclined in opposite directions as illustrated in Fig. 1, whereby the band-ends are moved inwardly toward each other when the shaft 20 is rotated.

In the application of the invention to an internal, or expanding, brake mechanism an actuating plate 37ª may be disposed between the opposing ends of the brake-sections 16ª and 18ª, which sections are normally drawn inwardly, and away from the brake drum 10 by the spring 11. A plate 32ª may be connected with the end of the brake-section 16ª as by a tongue on the plate which extends into a groove in the section. Said plates are provided with the recesses and strut pins as heretofore set forth. A pivot screw 13 may be screw-threaded in the brake-section 18ª and extend into a cupped recess in the middle of the lower face of the actuating plate 37ª and serve to hold said plate in position and also as a self-adjusting seat for said plate. Adjustments to compensate for the wear of the brake lining may be made by advancing said screw in an obvious manner. An actuating arm 26ª may be integral with said actuating plate.

As thus arranged, the rotation of the actuating plate in the proper direction forces the brake-sections outwardly to set the brake, the actuating plate following the outward movement of the section 18ª.

The construction may be otherwise modified without departing from the spirit of the invention.

I claim:

1. Brake mechanism including a brake-drum, a resilient brake band encircling said drum and having proximate end-portions adapted to be moved inwardly toward each other to contract the band about the drum, and brake actuating mechanism including a shaft passed loosely through said end-portions, band-plates carried by the remote faces of said end-portions, actuating plates carried by said shaft in normal approximate contact with said band-plates, said plates having recesses in their proximate faces which cooperate to form inclined pin-enclosing slots, strut-pins received loosely in the slots of cooperating plates, and means to rotate said actuating plates whereby to straighten said strut-pins and thereby force the end-portions of said band inwardly.

2. Brake mechanism including a brake drum, a resilient brake band encircling said drum and having a free end-portion, and means to contract said band about said drum including a plate carried by the end-portion of said band, a shaft passed loosely through said end-portion and plate, an actuating plate disposed on said shaft in normal approximate contact with said band-plate, said plates having a plurality of slots in their proximate faces which cooperate to form inclined pin-enclosing slots, a plurality of strut-pins disposed loosely in said slots and in both plates, and means to rotate said actuating plate, whereby to straighten said strut-pins and exert a pressure on said brake-band.

3. Brake mechanism including the combination of two plates, a brake-band connected with one of said plates and arranged to urge said plates into proximate relation, said plate having opposed recesses therein which cooperate to form inclined slots, inclined strut-pins received loosely in said slots and having similar end-portions disposed mainly in one plate, and their opposite end-portions disposed mainly in said other plate, and means to rotate one plate relative to the other, whereby to straighten said strut-pins and apply pressure on said brake band.

4. The combination of two cooperating plates, yielding means to urge said plates toward a normal proximate position, said plates having cooperating recesses therein which normally register to form substantially closed inclined slots between the plates, inclined strut-pins received loosely in said inclined slots and having their similar end-portions disposed mainly in one plate and their opposite end-portions disposed mainly in the other plate, and means to rotate one plate relatively to said other plate, whereby to straighten said strut-pins and forcibly separate said plates in an axial direction against the action of said yielding means.

5. Brake actuating mechanism including the combination of a rotatable shaft, a plate associated with the brake mechanism and arranged for axial movement along said shaft, an actuating plate disposed adjacent said first plate and having a connection with said shaft whereby it is arranged for angular movement and strut-members extended between and having pivotal connections with said plates.

6. Brake actuating mechanism including the combination of a shaft, a plate associated with the brake mechanism and arranged for axial movement along said shaft, an actuating plate disposed adjacent said first plate and arranged for angular movement, strut-members extended between and having pivotal connections with said plates and inclined against the direction of angular movement of said actuating plate, and means including the brake mechanism to urge said plates constantly toward each other.

7. Brake actuating mechanism including the combination of a shaft, a plate associated with the brake mechanism and arranged for axial movement along said shaft, an actuating plate disposed adjacent said first plate and arranged for angular movement, and strut-members received in recesses in and extended between and having pivotal connections with said plates and inclined against the direction of angular movement of said actuating plate, said strut-members having a lost-motion connection with said plates.

8. Brake actuating mechanism including the combination of a shaft, a plate associated with the brake mechanism and arranged for axial movement along said shaft, an actuating plate disposed adjacent said first plate and arranged for angular movement, and strut-members received in recesses in and extended between and having pivotal connections with said plates and inclined against the direction of angular movement of said actuating plate, said strut-members being loose in said recesses whereby to permit a substantial angular movement of said actuating plate independent of axial movement of said cooperating plate.

9. The combination of a rectilinearly-movable plate, an adjacent angularly-movable actuating plate, means to urge said plates toward and into normal contact with each other, said plates having cooperating inclined recesses therein, and strut-pins received in said recesses and inclined against the direction of angular movement of said actuating plate.

10. The combination of a rectilinearly-movable plate, an adjacent angularly-movable actuating plate, means to urge said plates toward each other, said plates having co-operating inclined recesses therein, and strut-pins received normally loosely in said recesses and inclined against the direction of angular movement of said actuating plate.

11. In a device of the class described, the combination of a pair of cooperating plates, one arranged for axial and the other for angular movement, inclined strut-members interposed between said plates whereby an angular movement of one plate effects an axial movement of the other plate, and means including said strut-members providing a lost-motion operative connection between said plates, whereby one of said plates can be moved independently of said other plate.

12. In a device of the class described, the combination of a pair of cooperating juxtaposed plates one arranged for angular and the other for axial movement, each plate having inclined recesses therein, means supporting said plates movably in such relation that normally corresponding recesses in both plates are in register to form inclined-slots which occupy both plates, strut-members received loosely in said slots, and means to rotate said angularly-movable plate, whereby to straighten said strut-members and separate said plates.

13. In a device of the class described, the combination of a pair of cooperating juxtaposed plates one arranged for angular and the other for axial movement, each plate having inclined recesses therein, means supporting said plates movably in such relation that normally corresponding recesses in both plates are in register to form inclined-slots which occupy both plates, strut-members received loosely in said slots, said strut-members being substantially shorter than the length of said slots, whereby said angularly movable plate can be moved a substantial amount free from operative engagement with said strut-members.

14. Brake actuating mechanism including a brake band having proximate and free end-portions, an operating shaft extended loosely through said end-portions, two sets of pressure-plates surrounding said shaft and disposed adjacent the remote faces of said end-portions, one plate of each set having a non-rotatable connection with its band-end and the other plate having a driving connection with said shaft, the plates of each set having registering recesses therein which are approximately tangential to a common diameter and are transversely disposed on said diameter, strut-pins received loosely in said recesses, and means to rotate said shaft, whereby to tilt said pins and contract the brake band.

15. Brake mechanism including a brake band having a free end, a plate having a self-seating engagement with said band-end and means to restrain it from rotation on said band, an operating plate disposed adjacent said band-plate, both plates having registering recesses therein, strut-pins received in said recesses and disposed angularly in both plates, and means to rotate said operating plate in a direction to tilt said strut-pins, whereby to separate said plates and contract said brake band.

16. The combination of a yielding member, a plate having a self-aligning bearing engagement and a non-rotating connection with said member, an operating plate rotatably supported in proximate relation with said first plate, both plates having normally registering recesses therein which are angularly inclined to the direction of rotation of said operating plate, strut-pins received in said recesses and adapted for pivotal engagement with both plates, and means to rotate said operating plate in a direction to tilt said strut-pins and move said yielding member.

In testimony whereof, I have signed my name to this specification.

HENRY A. TUTTLE.